US012562369B2

(12) United States Patent
Wu et al.

(10) Patent No.: US 12,562,369 B2
(45) Date of Patent: Feb. 24, 2026

(54) NEGATIVE ELECTRODE AND LITHIUM ION BATTERY EMPLOYING THE SAME

(71) Applicant: INDUSTRIAL TECHNOLOGY RESEARCH INSTITUTE, Hsinchu (TW)

(72) Inventors: Wei-Hsin Wu, Hsinchu (TW); Chih-Ching Chang, Hsinchu (TW); Chia-Chen Fang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 842 days.

(21) Appl. No.: 17/544,500

(22) Filed: Dec. 7, 2021

(65) Prior Publication Data

US 2022/0209218 A1 Jun. 30, 2022

Related U.S. Application Data

(60) Provisional application No. 63/131,125, filed on Dec. 28, 2020.

(51) Int. Cl.
*H01M 4/134* (2010.01)
*H01M 4/02* (2006.01)
(Continued)

(52) U.S. Cl.
CPC ........... *H01M 4/134* (2013.01); *H01M 4/366* (2013.01); *H01M 4/628* (2013.01); *H01M 4/662* (2013.01);
(Continued)

(58) Field of Classification Search
CPC ...... H01M 4/134; H01M 4/366; H01M 4/628; H01M 4/662; H01M 10/0525; H01M 2004/027
See application file for complete search history.

(56) References Cited

U.S. PATENT DOCUMENTS 9,099,757 B2 8/2015 Tanaka et al.
9,496,547 B2 11/2016 Tsai et al.
(Continued)

FOREIGN PATENT DOCUMENTS

CN 100568613 C 12/2009
CN 107658472 A 2/2018
(Continued)

OTHER PUBLICATIONS

Extended European Search Report for European Application No. 21212822.7, dated May 9, 2022.
(Continued)

*Primary Examiner* — Armindo Carvalho, Jr.
(74) *Attorney, Agent, or Firm* — Birch, Stewart, Kolasch & Birch, LLP

(57) ABSTRACT

A negative electrode and a lithium ion battery employing the same are provided. The negative electrode includes an active layer and a composite layer disposed on the active layer. The composite layer includes a lithiophilic nanoparticle, a metal nanoparticle and a binder. The binding energy ($\Delta E$) of the lithiophilic nanoparticle with lithium is less than or equal to $-2.5$ eV. The metal nanoparticle has a standard Gibbs free energy of reaction ($\Delta rG$) less than 0. The weight ratio of the lithiophilic nanoparticle to the metal nanoparticle is from 1:1 to 8:1, and the amount of binder is from 10 wt % to 25 wt %, based on the total weight of the lithiophilic nanoparticle and the metal nanoparticle.

6 Claims, 4 Drawing Sheets

_10_

11 — 14

12

13

(51) Int. Cl.

| | |
|---|---|
| *H01M 4/36* | (2006.01) |
| *H01M 4/62* | (2006.01) |
| *H01M 4/66* | (2006.01) |
| *H01M 10/0525* | (2010.01) |

(52) U.S. Cl.
CPC .. *H01M 10/0525* (2013.01); *H01M 2004/027* (2013.01)

(56) References Cited

U.S. PATENT DOCUMENTS

| | | | |
|---|---|---|---|
| 10,283,747 | B2 | 5/2019 | Isozaki et al. |
| 10,403,931 | B2 | 9/2019 | Holme et al. |
| 10,454,112 | B2 | 10/2019 | Wu et al. |
| 10,637,043 | B2 | 4/2020 | Zhamu et al. |
| 2009/0162750 | A1* | 6/2009 | Kawakami ............... H01M 4/58 252/182.1 |
| 2013/0045427 | A1* | 2/2013 | Zhamu ............... H01M 10/0525 977/734 |
| 2013/0260260 | A1 | 10/2013 | Lu et al. |
| 2013/0271085 | A1* | 10/2013 | Chen ................... H01M 4/1393 429/188 |
| 2014/0220439 | A1 | 8/2014 | Badding et al. |
| 2015/0056488 | A1 | 2/2015 | Zhang et al. |
| 2016/0104891 | A1 | 4/2016 | Holme |
| 2016/0329567 | A1 | 11/2016 | Lee et al. |
| 2017/0062829 | A1 | 3/2017 | Ryu et al. |
| 2019/0157723 | A1 | 5/2019 | Suzuki et al. |
| 2019/0260091 | A1 | 8/2019 | Rho et al. |
| 2021/0005879 | A1* | 1/2021 | Joo ........................ H01M 4/661 |
| 2022/0271289 | A1* | 8/2022 | Lee ........................ H01M 4/483 |

FOREIGN PATENT DOCUMENTS

| | | |
|---|---|---|
| CN | 108448063 A | 8/2018 |
| CN | 109273870 A | 1/2019 |
| CN | 107305950 B | 11/2019 |

OTHER PUBLICATIONS

Pu et al., "Recently developed strategies to restrain dendrite growth of Li metal anodes for rechargeable batteries," Rare Metals, vol. 39, No. 6, May 28. 2020, pp. 616-635 (20 pages total).

Gao et al., "Polymer-inorganic solid-electrolyte interphase for stable lithium metal batteries under lean electrolyte conditions", Nature Materials, Apr. 2019, vol. 18, pp. 384-391.

Kim et al., "Langmuir-Blodgett artificial solid-electrolyte interphases for practical lithium metal batteries", Nature Energy, Oct. 2018, vol. 3, pp. 889-898.

Li et al., "Revealing Principles for Design of Lean-Electrolyte Lithium Metal Anode via In Situ Spectroscopy", J. Am. Chem. Soc., 2020, vol. 142, pp. 2012-2022.

Liu et al., "A scalable 3D lithium metal anode", Elsevier, Energy Storage Materials, Jan. 2019, vol. 16, pp. 505-511.

Mukherjee et al., "Defect-induced plating of lithium metal within porous graphene networks", Nature Communications, 2014, vol. 5, No. 3710 , pp. 1-10.

Zhang et al., "Lithiophilic-lithiophobic gradient interfacial layer for a highly stable lithium metal anode", Nature Communications, 2018, vol. 9, No. 3729, pp. 1-11.

Zuo et al., "Lithiophilic Silver Coating on Lithium Metal Surface for Inhibiting Lithium Dendrites", Frontiers in Chemistry, Feb. 2020, vol. 8, No. 109, pp. 1-8.

* cited by examiner

100 charge-discharge cycle

NEGATIVE ELECTRODE AND LITHIUM ION BATTERY EMPLOYING THE SAME

CROSS REFERENCE TO RELATED APPLICATIONS

This application claims the benefit of U.S. Provisional Application No. 63/131,125, filed on Dec. 28, 2020, which is hereby incorporated herein by reference.

TECHNICAL FIELD

The disclosure relates to a negative electrode and a lithium ion battery employing the same.

BACKGROUND

Lithium ion secondary batteries are mainstream commercial products, and they are presently being developed to be light-weight, low-volume, and safer, and to have a higher energy capacity and a longer life cycle. In conventional liquid electrolyte lithium ion batteries, the energy storage cost per unit is high due to the low gravimetric energy density and the limited life cycle. However, unilaterally increasing the energy density of batteries can easily induce serial safety problems in electrochemical batteries, such as liquid leakage, battery swelling, heating, fuming, burning, explosion, and the like.

Dendrite growth is a phenomenon that occurs during battery charging, whereby active materials, usually metals such as zinc or lithium, are reduced from their oxidized state and deposited onto a substrate. Depending on the charging conditions, the metal may be deposited a dendritic form, and has the potential to penetrate the separator and then short-circuit the cell, resulting in an explosion which is known as thermal runaway.

Therefore, a novel design and structure of a negative electrode used in the metal-ion secondary battery is called for to solve the aforementioned problems.

SUMMARY

According to embodiments of the disclosure, the disclosure provides a negative electrode, including an active layer and a composite layer, wherein the composite layer is disposed on the active layer. According to embodiments of the disclosure, the composite layer includes a lithiophilic nanoparticle, a metal nanoparticle, and a binder, wherein the binding energy ($\Delta E$) of the lithiophilic nanoparticle with lithium is less than or equal to $-2.5$ eV, and the metal nanoparticle has a standard Gibbs free energy of reaction ($\Delta rG$) less than 0. According to embodiments of the disclosure, the weight ratio of the lithiophilic nanoparticle to the metal nanoparticle is from 1:1 to 8:1. According to embodiments of the disclosure, the amount of the binder is from 10 wt % to 25 wt %, based on the total weight of the lithiophilic nanoparticle and the metal nanoparticle.

According to other embodiments of the disclosure, the disclosure provides a metal-ion battery, such as lithium ion battery. The lithium ion battery includes a positive electrode; a separator; the aforementioned negative electrode; and, an electrolyte liquid. The negative electrode is separated from the positive electrode by the separator, and the electrolyte liquid disposed between the positive electrode and the negative electrode.

A detailed description is given in the following embodiments.

DETAILED DESCRIPTION

Figure 1:
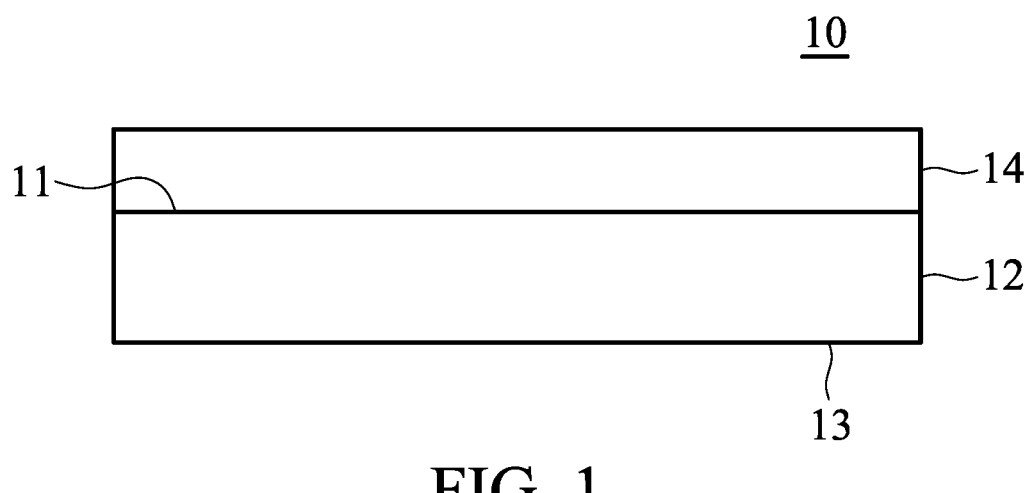
FIG. 1 is a schematic view of a negative electrode according to an embodiment of the disclosure.

The negative electrode and the lithium ion battery of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

It should be noted that the elements or devices in the drawings of the disclosure may be present in any form or morphology known to those skilled in the art. In addition, the expression "a layer overlying another layer", "a layer is disposed above another layer", "a layer is disposed on another layer" and "a layer is disposed over another layer" may refer to a layer that directly contacts the other layer, and they may also refer to a layer that does not directly contact the other layer, there being one or more intermediate layers disposed between the layer and the other layer.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

The disclosure provides a negative electrode, such as negative electrode used in lithium ion battery. The negative electrode includes an active layer, and a composite layer, wherein the composite layer includes a lithiophilic nanoparticle, a metal nanoparticle, and a binder. By means of the composite layer, the concentration of lithium ion flow at the surface of the negative electrode can be uniformized effectively, thereby facilitating the conversion of lithium ions. In the composite layer, since the lithiophilic nanoparticle (such as lithiophilic conductive nanoparticle, lithiophilic nonconductive nanoparticle, or a combination thereof) is used in concert with metal nanoparticle (such as: alloy conductive nanoparticle) in a specific ratio, the deposition morphology of lithium can be altered, dendrite growth can be inhibited, and the volume swelling issue during battery charging and discharging can be mitigated, thereby prolonging the lifespan of the lithium ion battery.

In addition, in the composite layer, the lithiophilic nanoparticle and metal nanoparticle are mixed with the binder in a specific ratio. As a result, the binder not only enhances the strength of the composite layer, but also facilitates a uniform lithium deposition while charging the battery. Furthermore, the weight per unit area of the composite layer of the disclosure should be controlled in a range from 0.2 $mg/cm^2$ to 2 $mg/cm^2$ in order to obtain a negative electrode which meets the requirement of the lithium ion battery with high energy density.

According to embodiments of the disclosure, the disclosure provides a negative electrode used in the lithium ion battery with high energy density (such as energy density greater than or equal to 300 Wh/KG).

According to embodiments of the disclosure, the disclosure also provides a lithium ion battery. The lithium ion battery includes the aforementioned negative electrode. By means of the negative electrode with the specific structure of the disclosure, the technical bottleneck problems of the lithium ion battery can be overcome (i.e. inhibiting dendrite growth and improving the problem of electrode swelling) and the obtained lithium ion battery can exhibit high energy density. As a result, the goals of increasing the efficiency and prolonging the lifespan of the battery can be achieved simultaneously.

According to embodiments of the disclosure, the disclosure provides a negative electrode. The negative electrode includes an active layer and a composite layer. The composite layer disposed on the active layer. According to embodiments of the disclosure, the composite layer includes a lithiophilic nanoparticle, a metal nanoparticle, and a binder, wherein the binding energy ($\Delta E$) of the lithiophilic nanoparticle with lithium is less than or equal to −2.5 eV, and the metal nanoparticle has a standard Gibbs free energy of reaction ($\Delta rG$) less than 0.

FIG. 1 is a schematic view of a negative electrode according to an embodiment of the disclosure. As shown in FIG. 1, the negative electrode 10 includes an active layer 12 and a composite layer 14. As shown in FIG. 1, the active layer 12 has a top surface 11 and a bottom surface 13, and the composite layer 14 is disposed on the top surface 11 of the active layer 12. According to embodiments of the disclosure, the active layer 12 can include lithium metal, lithium-containing alloy, or a combination thereof. According to embodiments of the disclosure, the lithium-containing alloy can be aluminum-lithium-containing alloy, lithium-magnesium-containing alloy, lithium-zinc-containing alloy, lithium-lead-containing alloy, or lithium-tin-containing alloy. According to embodiments of the disclosure, the aluminum-lithium-containing alloy is distinct from the lithium-magnesium-containing alloy, lithium-zinc-containing alloy, lithium-lead-containing alloy, and lithium-tin-containing alloy. According to embodiments of the disclosure, the lithium-magnesium-containing alloy is distinct from the aluminum-lithium-containing alloy, lithium-zinc-containing alloy, lithium-lead-containing alloy, or lithium-tin-containing alloy. According to embodiments of the disclosure, the lithium-zinc-containing alloy is distinct from the lithium-magnesium-containing alloy, aluminum-lithium-containing alloy, lithium-lead-containing alloy, or lithium-tin-containing alloy. According to embodiments of the disclosure, the lithium-lead-containing alloy is distinct from the lithium-magnesium-containing alloy, lithium-zinc-containing alloy, aluminum-lithium-containing alloy, or lithium-tin-containing alloy. According to embodiments of the disclosure, the lithium-tin-containing alloy is distinct from the lithium-magnesium-containing alloy, lithium-zinc-containing alloy, lithium-lead-containing alloy, or aluminum-lithium-containing alloy.

According to embodiments of the disclosure, the thickness of the active layer 12 is not limited and can be optionally modified by a person of ordinary skill in the field. For example, the thickness of the active layer 12 can be about 1 $\mu$m to 1,000 $\mu$m (such as about 10 $\mu$m, 50 $\mu$m, 100 $\mu$m, 200 $\mu$m, 300 $\mu$m, 400 $\mu$m, 500 $\mu$m, 600 $\mu$m, 700 $\mu$m, 800 $\mu$m, or 900 $\mu$m).

According to an embodiment of the disclosure, the active layer 12 can consist of lithium metal. According to an embodiment of the disclosure, the negative electrode 10 can consist of the active layer 12 and the composite layer 14.

According to embodiments of the disclosure, the composite layer includes a lithiophilic nanoparticle, a metal nanoparticle, and a binder. According to embodiments of the disclosure, the composite layer can consist of a lithiophilic nanoparticle, a metal nanoparticle, and a binder.

According to embodiments of the disclosure, the composite layer must include lithiophilic nanoparticle in order to force the composite layer exhibiting sufficient lithiophilicity, thereby ensuring that the negative electrode can inhibit dendrite growth and mitigate the volume swelling issue. The term "lithiophilic nanoparticle" of the disclosure means the material which is apt to bind with lithium, and the lithiophilicity of the material can be determined by the binding energy ($\Delta E$) between the material and lithium. According to embodiments of the disclosure, the binding energy ($\Delta E$) of the lithiophilic nanoparticle with lithium is less than or equal to −2.5 eV The binding energy means the free energy for binding two substances. The two substances are apt to bind together when lowering the binding energy. The binding energy ($\Delta E$) between the lithiophilic material and lithium can be measured by the following equation: $\Delta E = E_{C\text{-}Li} - E_C - E_{Li}$, wherein $E_{C\text{-}Li}$ is the free energy for binding the lithiophilic material with lithium; $E_C$ is the free energy of the lithiophilic material; and, $E_{Li}$ is the free energy of lithium (at 0 K and under vacuum state). According to embodiments of the disclosure, the lithiophilic nanoparticle can include lithiophilic metal oxide nanoparticle, lithiophilic conductive carbon material nanoparticle, or a combination thereof.

According to embodiments of the disclosure, the lithiophilic nanoparticle is lithiophilic metal oxide nanoparticle. Table 1 lists the binding energy ($\Delta E$) (between the metal oxide nanoparticle and lithium).

5

TABLE 1

| | $\Delta E(eV)$ |
|---|---|
| $TiO_2$ | -2.27 |
| $\gamma$- $Al_2O_3$ | -2.55 |
| $SiO_2$ | -2.96 |
| $ZrO_2$ | -2.63 |
| $ZnO$ | -3.01 |
| $SnO_2$ | -3.34 |
| $V_2O_5$ | -4.49 |

According to embodiments of the disclosure, the lithiophilic nanoparticle is lithiophilic conductive carbon material nanoparticle. According to embodiments of the disclosure, the binding energy ($\Delta E$) of the lithiophilic conductive carbon material nanoparticle of the disclosure with lithium is less than or equal to -2.5 eV. For example, the lithiophilic conductive carbon material nanoparticle of the disclosure may be graphite, fluorocarbon, nitrogen-doped graphite, nitrogen-doped graphene, or a combination thereof. According to embodiments of the disclosure, when the lithiophilic conductive carbon material nanoparticle is graphite or nitrogen-doped graphite, the graphite or nitrogen-doped graphite has a ratio between the intensity of G-band and the intensity of D-band (i.e. IG/ID value) in a Raman spectrum less than 1. When the negative electrode employs the graphite or nitrogen-doped graphite, which has a IG/ID value greater than or equal to 1, serving as nanoparticle, the obtained negative electrode exhibits poor ability for inhibiting dendrite growth and relatively low lithiophilicity, thereby deteriorate the performance and life cycle of the battery. The intensity of D-band is a peak intensity existing within 1300 $cm^{-1}$ to 1400 $cm^{-1}$ in Raman scattering spectra; the intensity of G-band is a peak intensity existing within 1580 cm to 1620 cm in Raman scattering spectra; and, IG/ID value means the ratio of the peak intensity (area) of G-band to the peak intensity (area) of D-band. According to embodiments of the disclosure, when the lithiophilic conductive carbon material nanoparticle is graphite or nitrogen-doped graphite, the binding energy ($\Delta E$) of the graphite or nitrogen-doped graphite with lithium is less than or equal to -2.5 eV, and the graphite or nitrogen-doped graphite has a ratio between the intensity of G-band and the intensity of D-band (i.e. IG/ID value) in a Raman spectrum less than 1.

According to embodiments of the disclosure, the particle size of the lithiophilic nanoparticle is less than or equal to about 100 nm, such as about 0.1 nm to 100 nm, 0.2 nm to 90 nm, 0.5 nm to 80 nm, or 1 nm to 70 nm. When the particle size of the lithiophilic nanoparticle is too large, the lithium ion flow concentration among the negative electrode surface would not be uniformed, resulting in that the obtained negative electrode exhibits poor ability for inhibiting dendrite growth and mitigating volume swelling.

According to embodiments of the disclosure, the lithiophilic nanoparticle is selected from a group consisting of the lithiophilic metal oxide nanoparticle and the lithiophilic conductive carbon material nanoparticle. According to embodiments of the disclosure, the lithiophilic nanoparticle can be $\gamma$-aluminum oxide, zirconium oxide, zinc oxide, silicon oxide, tin oxide, vanadium oxide, lithium-lanthanum-zirconium oxide, lithium-lanthanum-titanium oxide, graphite with IG/ID value less than 1, fluorocarbon, nitrogen-doped graphite with IG/ID value less than 1, nitrogen-doped graphene, or a combination thereof. According to embodiments of the disclosure, the lithiophilic nanoparticle can be selected from a group consisting of $\gamma$-aluminum oxide, zirconium oxide, zinc oxide, silicon oxide, tin oxide, vanadium oxide, lithium-lanthanum-zirconium oxide, lithium-lanthanum-titanium oxide, graphite with IG/ID value less than 1, fluorocarbon, nitrogen-doped graphite with IG/ID value less than 1, and nitrogen-doped graphene.

According to embodiments of the disclosure, the lithiophilic nanoparticle consists of the lithiophilic metal oxide nanoparticle and lithiophilic conductive carbon material nanoparticle. When the lithiophilic nanoparticle consists of the lithiophilic metal oxide nanoparticle and lithiophilic conductive carbon material nanoparticle, the ratio of the lithiophilic metal oxide nanoparticle and the lithiophilic conductive carbon material nanoparticle can be about 1:99 to 99:1, such as: 1:9, 1:8, 1:7, 1:6, 1:5, 1:4, 1:3, 1:2, 1:1, 2:1, 3:1, 4:1, 5:1, 6:1, 7:1, 8:1, or 9:1.

According to embodiments of the disclosure, the metal nanoparticle of the disclosure is apt to form an alloy with lithium after charging the battery. The metal nanoparticle has a standard Gibbs free energy of reaction ($\Delta rG$) less than 0. Herein, the Gibbs free energy of reaction of the metal nanoparticle means the Gibbs free energy of the metal nanoparticle undergoes lithium alloying reaction (or lithium alloy conversation) at standard condition can be measured by the following equation: $\Delta rG = \Delta rH_{298.15K} - T\Delta rS_{298.15\ K}$, wherein $\Delta rG$ is Gibbs energy of formation of the reaction; $\Delta rH_{298.15K}$ is the enthalpy change of the alloy reaction at 298.15K; $\Delta rS_{298.15K}$ is the entropy change of the alloy reaction at 298.15 K; T is the temperature of reaction. The standard condition is a condition having a pressure of about a standard atmospheric pressure (1 atm) and having a temperature of about 298.15K. When the standard Gibbs free energy of reaction is less than 0, it indicates that new chemical bonds may be formed. Namely, the metal nanoparticle is apt to be coalloyed with lithium to form $Li_xM_y$. Conversely, when the standard Gibbs free energy of reaction is greater than 0, it indicates that there is no new chemical bond being formed. Namely, the metal nanoparticle is not apt to be coalloyed with lithium. According to embodiments of the disclosure, the resistivity of the metal nanoparticle can be less than or equal to about $9.9 \times 10^{-7}$ $\Omega \cdot m$, such as less than or equal to about $5.0 \times 10^{-7}$ $\Omega \cdot m$, less than or equal to about $1.0 \times 10^{-7}$ $\Omega \cdot m$, or less than or equal to about $5.0 \times 10^{-7}$ $\Omega \cdot m$.

Table 2 lists the standard Gibbs free energy of reaction and the resistivity of metal nanoparticles.

TABLE 2

| | $\Delta rG$ (kJ/mol) | resistivity ($\Omega \cdot m$) (20° C.) |
|---|---|---|
| Cu | >0 (@25° C.) | $1.70 \times 10^{-8}$ $\Omega \cdot m$ |
| Ag | <0 (@25° C.) | $1.61 \times 10^{-8}$ $\Omega \cdot m$ |
| Mg | <0 (@25° C.) | $4.41 \times 10^{-8}$ $\Omega \cdot m$ |
| Zn | <0 (@25° C.) | $5.93 \times 10^{-8}$ $\Omega \cdot m$ |
| Au | <0 (@25° C.) | $2.44 \times 10^{-8}$ $\Omega \cdot m$ |
| Sn | <0 (@25° C.) | $1.14 \times 10^{-7}$ $\Omega \cdot m$ |

As shown in Table 2, the metal nanoparticle can be silver, gold, tin, zinc, magnesium, or a combination thereof. According to embodiments of the disclosure, since the composite layer 14 is directly disposed on the active layer 12, the metal nanoparticle of the composite layer can not only uniform the electronic flow and form an alloy with lithium during charging and discharging, but also facilitates the uniform lithium deposition on the surface of the composite layer.

According to embodiments of the disclosure, the particle size of the metal nanoparticle is less than or equal to about 100 nm, such as about 0.1 nm to 100 nm, 0.2 nm to 90 nm, 0.5 nm to 80 nm, or 1 nm to 70 nm. When the particle size of the metal nanoparticle is too large, the lithium nucleation sites cannot be formed uniformly on the surface of the composite layer, resulting in the accumulation of the lithium nucleation sites. The accumulation of the lithium nucleus sites will not be able to effectively form a more uniform lithium deposition through the alloying reaction, resulting in that the obtained negative electrode exhibits poor ability for inhibiting dendrite growth and mitigating volume swelling.

According to embodiments of the disclosure, in order to effectively uniform the concentration of lithium ion flow at the surfaces of the negative electrode and promote the conversion of lithium ions, the weight ratio of the lithiophilic nanoparticle to the metal nanoparticle can be from 1:1 to 8:1, such as about 2:1, 3:1, 4:1, 5:1, 6:1, or 7:1. When the weight ratio of the lithiophilic nanoparticle to the metal nanoparticle is too high or too low, the formation of dendrites would not be inhibited and the volume swelling would not be mitigated effectively.

According to embodiments of the disclosure, the binder can include polyvinyl alcohol (PVA), polytetrafluoroethylene (PTFE), polyvinylidene fluoride (PVDF), perfluoroalkoxy alkane (PFA), fluorinated ethylene propylene (FEP), polyvinylidene fluoride-co-hexafluoropropylene(PVDF-HFP), sodium carboxymethyl cellulose (CMC) fiber, poly (styrene-co-butadiene), fluorine rubber, polyurethane, polyvinylpyrrolidone, polyvinyl chloride, polyacrylonitrile, polybutadiene, poly(acrylic acid), or a combination thereof. According to embodiments of the disclosure, the binder can be fluorine-containing polymer, such as polytetrafluoroethylene (PTFE), polyvinylidene fluoride (PVDF), perfluoroalkoxy alkane (PFA), fluorinated ethylene propylene (FEP), or polyvinylidene fluoride-co-hexafluoropropylene (PVDF-HFP). Due to the hydrophobicity of the fluorine-containing polymer, the composite layer can reduce the amount of moisture which passes through the solid electrolyte membrane, thereby avoiding the performance deterioration of the battery. According to embodiments of the disclosure, the amount of binder is from 10 wt % to 25 wt % (such as about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, or 24 wt %), based on the total weight of the lithiophilic nanoparticle and the metal nanoparticle. When the amount of binder is too low, the composite layer is not apt to be formed resulting in that the lithium deposition in the whole structure would be non-uniform. When the amount of binder is too high, the interfacial impedance between the composite layer and the active layer would be increased. As a result, the volume swelling of the electrode would not be inhibited, thereby deteriorating the battery performance.

According to embodiments of the disclosure, the polymer serving as the binder can have a weight average molecular weight (Mw) of about 800 to 5,000,000, such as about 1,000, 2,000, 3,000, 5,000, 8,000, 10,000, 10,000, 20,000, 30,000, 50,000, 80,000, 100,000, 200,000, 500,000, 800,000, 1,000, 000, 2,000,000, 3,000,000, 4,000,000, or 4,500,000. The weight average molecular weight (Mw) of the oligomer or polymer of the disclosure can be determined by gel permeation chromatography (GPC) based on a polystyrene calibration curve.

According to embodiments of the disclosure, the thickness of the composite layer can depend on the weight per unit area of the composite layer. The weight per unit area of the composite layer is accordingly increased along with the increase of the thickness of the composite layer. According to embodiments of the disclosure, the weight per unit area of the composite layer of the disclosure can be controlled within a range from 0.2 mg/cm$^2$ to 2 mg/cm$^2$. When the weight per unit area of the composite layer is low, it indicates that the porosity per unit volume is too high, easily resulting in the structure being unstable. When the weight per unit area of the composite layer is too high, it indicates that the porosity per unit volume is too low, resulting in poor ability for mitigating volume swelling. As a result, the energy density of the lithium ion battery would be further reduced. According to embodiments of the disclosure, the thickness of the composite layer can be about 1 μm to 150 μm (such as about 5 μm, 10 μm, 20 μm, 25 μm, 50 μm, 100 μm, or 120 μm).

Figure 2:
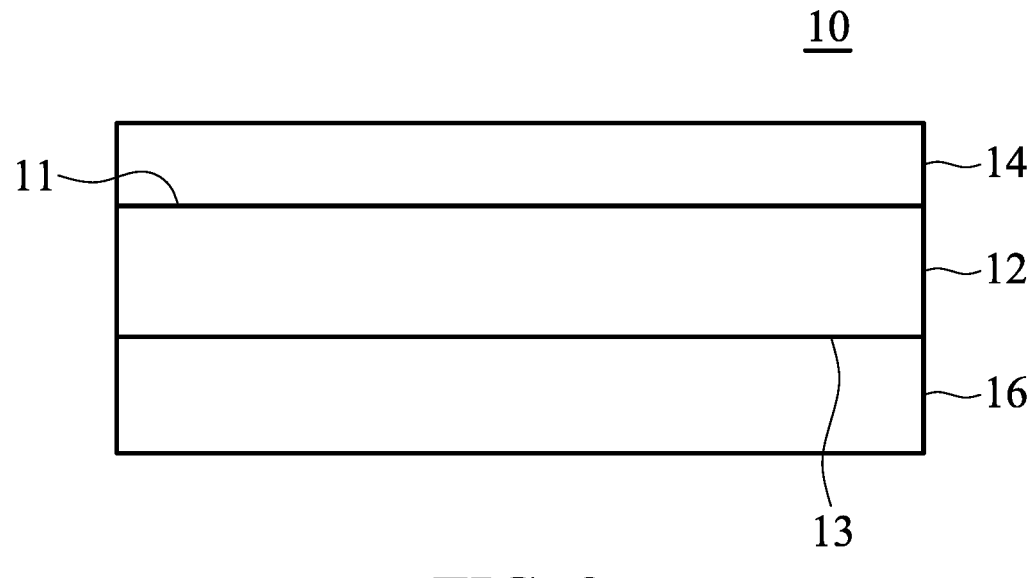
FIG. 2 is a schematic view of a negative electrode according to another embodiment of the disclosure.

As shown in FIG. 2, the negative electrode of the disclosure 10 can further include a current-collecting layer 16 directly contacting with the bottom surface 13 of the active layer 12. Namely, the active layer 12 is disposed between the composite layer 14 and the current-collecting layer 16. According to embodiments of the disclosure, the current-collecting layer 16 can include a metal foil. For example, suitable material of the current-collecting layer 16 can be aluminum, copper, nickel, aluminum-containing alloy, copper-containing alloy, nickel-containing alloy, stainless steel, or a combination thereof. According to embodiments of the disclosure, the aluminum-containing alloy is distinct from the copper-containing alloy, the nickel-containing alloy, or the stainless steel. According to embodiments of the disclosure, the copper-containing alloy is distinct from the aluminum-containing alloy, the nickel-containing alloy, or the stainless steel. According to embodiments of the disclosure, the nickel-containing alloy is distinct from the aluminum-containing alloy, the copper-containing alloy, or the stainless steel. According to embodiments of the disclosure, the stainless steel is distinct from the aluminum-containing alloy, the nickel-containing alloy, or the copper-containing alloy. The thickness of the current-collecting layer is not limited and can be optionally modified by a person of ordinary skill in the field, such as from 5 μm to 500 μm.

According to embodiments of the disclosure, the method for fabricating the negative electrode of the disclosure can include following steps. First, an active layer is provided. According to some embodiments of the disclosure, the active layer can be also disposed on a current-collecting layer. Next, a lithiophilic nanoparticle, and a metal nanoparticle are dispersed in a first solvent, obtaining a first solution after mixing completely. Next, the binder is dissolved in a second solvent, obtaining a second solution after mixing completely. Next, the first solution is completely mixed with the second solution, obtaining a negative electrode slurry. According to embodiments of the disclosure, the solid content of the first solution and the solid content of the second solution can be controlled in a range from about 1 wt % to 20 wt % individually, such as 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, or 19 wt %. Namely, the solid content of the negative electrode slurry can be from about 1 wt % to 20 wt %, such as 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, or 19 wt %. Next, the negative electrode slurry is coated on the active layer via a coating process to form a film. Next, the film is subjected to a baking process, obtaining the negative electrode having a composite layer of the disclosure.

According to embodiments of the disclosure, the coating process can be screen printing, spin coating, bar coating, blade coating, roller coating, solvent casting, or dip coating. According to embodiments of the disclosure, the temperature of the baking process can be from 50° C. to 160° C., such as 70° C., 100° C., or 150° C. According to embodiments of the disclosure, the first solvent and the second solvent can be independently 1-methyl-2-pyrrolidone (NMP), N, N-dimethylformamide (DMF), N,N-dimethylacetamide (DMAc), pyrrolidone, N-dodecylpyrrolidone, γ-butyrolactone, or a combination thereof. According to embodiments of the disclosure, the thickness of the composite layer can be adjusted by the solid content of the negative electrode slurry.

The negative electrode of the disclosure is suitable for serving as the negative electrode of the metal-ion battery (such as lithium ion battery). The lithium ion battery (such as lithium ion secondary battery or lithium-containing polymer quasi-solid battery) includes the negative electrode of the disclosure not only exhibits higher safety and better performance (such as high energy density and Coulombic efficiency), but also has excellent life cycle.

Figure 3:
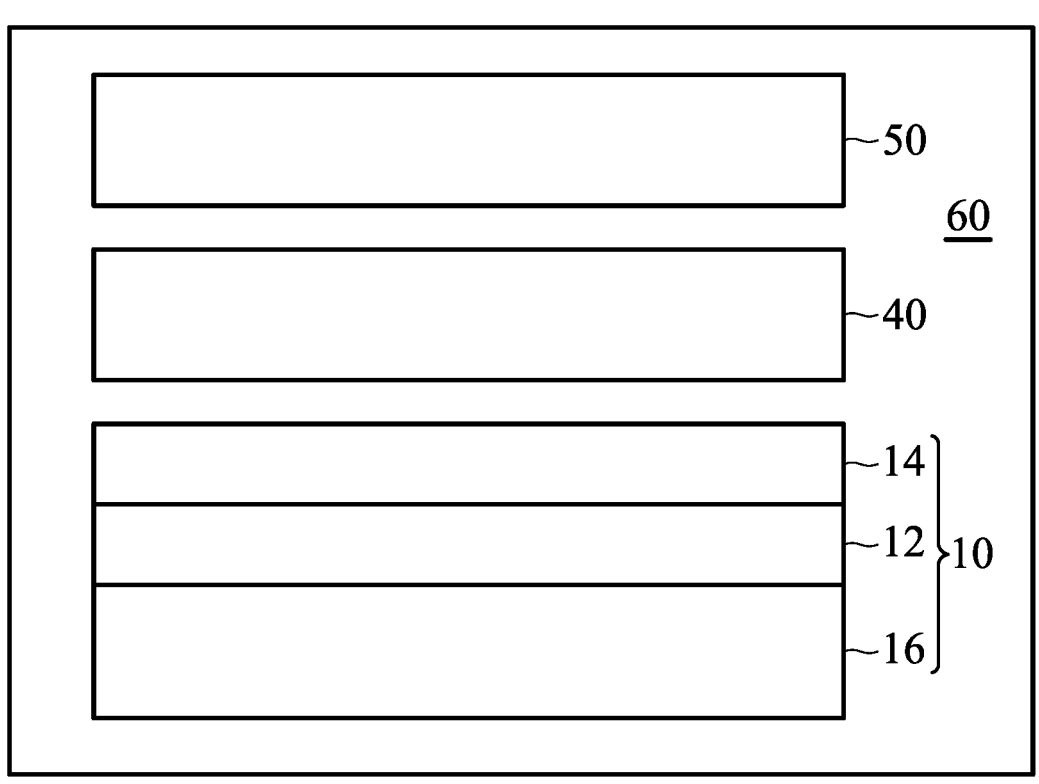
FIG. 3 is a schematic view of a lithium ion battery according to an embodiment of the disclosure.

According to embodiments of the disclosure, the disclosure also provides a lithium ion battery including aforementioned electrode. As shown in FIG. 3, the lithium ion battery 100 includes a negative electrode 10, a positive electrode 50, and a separator 40, wherein the negative electrode 10 is separated from the positive electrode 50 by the separator 40. According to embodiments of the disclosure, the battery 100 may additionally include an electrolyte liquid 60, and the electrolyte liquid 60 is disposed between the negative electrode 10 and the positive electrode 50. The structure stacked by the negative electrode 10, separator 40 and the positive electrode 50 is immersed in the electrolyte liquid 60. Namely, the battery 100 is filled with the electrolyte liquid 60. The negative electrode 10 can be the electrode of the disclosure. According to embodiments of the disclosure, the negative electrode 10 can include the active layer 12 and the composite layer 14. According to embodiments of the disclosure, the negative electrode 10 can consist of the active layer 12 and the composite layer 14. According to embodiments of the disclosure, the negative electrode 10 can include the active layer 12, the conductive layer 14, and the current-collecting layer 16. According to embodiments of the disclosure, the negative electrode 10 can consist of the active layer 12, the composite layer 14, and the current-collecting layer 16. According to embodiments of the disclosure, the positive electrode 50 can include a positive electrode active material. According to embodiments of the disclosure, the positive electrode active material includes elementary sulfur, organic sulfide, sulfur carbon composite, metal-containing lithium oxide, metal-containing lithium sulfide, metal-containing lithium selenide, metal-containing lithium telluride, metal-containing lithium phosphide, metal-containing lithium silicide, metal-containing lithium boride, or a combination thereof. In particular, the metal is selected from a group consisting of aluminum, vanadium, titanium, chromium, copper, molybdenum, niobium, iron, nickel, cobalt, and manganese. According to embodiments of the disclosure, the positive electrode active material can be lithium-cobalt oxide ($LiCoO_2$), lithium-nickel oxide ($LiNiO_2$), lithium-manganese oxide ($LiMn_2O_4$), lithium-manganese-cobalt oxide ($LiMnCoO_4$), lithium-cobalt-nickel-manganese oxide ($LiCo_{0.3}Ni_{0.3}Mn_{0.3}O$), lithium-cobalt phosphate ($LiCoPO_4$), lithium-manganese-chromium oxide ($LiMnCrO_4$), lithium-nickel-vanadium oxide ($LiNiVO_4$), lithium-manganese-nickel oxide ($LiMn_{1.5}Ni_{0.5}O_4$), lithium-cobalt-vanadium oxide ($LiCoVO_4$), or a combination thereof. According to embodiments of the disclosure, the positive electrode may additionally include a positive electrode current-collecting layer (not shown), and the positive electrode active material is disposed on the positive electrode current-collecting layer or disposed in the positive electrode current-collecting layer. According to an embodiment of the disclosure, the positive electrode can consist of the positive electrode active material and the positive electrode current-collecting layer. According to embodiments of the disclosure, the positive electrode current-collecting layer can include metal foil, such as copper foil, aluminum foil, carbon-plating aluminum foil, stainless steel foil, or other metal foil (such as platinum or titanium).

According to embodiments of the disclosure, the separator 40 can include insulating material, such as polyethylene (PE), polypropylene (PP), polytetrafluoroethylene (PTFE), polyamide, polyvinyl chloride (PVC), poly(vinylidene fluoride), polyaniline, polyimide, non-woven fabric, polyethylene terephthalate, polystyrene (PS), cellulose, or a combination thereof. For example, the separator can be PE/PP/PE multilayer composite structure. According to embodiments of the disclosure, the thickness of the separator is not limited and can be optionally modified by a person of ordinary skill in the field. For example, the thickness of the separator can be from about 1 μm to 1,000 μm (such as about 10 μm, 50 μm, 100 μm, 200 μm, 300 μm, 400 μm, 500 μm, 600 μm, 700 μm, 800 μm, or 900 μm). When the thickness of the separator is too high, the energy density of the battery is reduced. When the thickness of the separator is too low, the cycling stability of the battery is deteriorated.

According to some embodiments of the disclosure, the electrolyte liquid can include solvent and lithium salt (or lithium-containing compound). According to embodiments of the disclosure, the solvent can be organic solvent, such as ester solvent, ketone solvent, carbonate solvent, ether solvent, alkane solvent, amide solvent, or a combination thereof. According to embodiments of the disclosure, the solvent can be 1,2-diethoxyethane, 1,2-dimethoxyethane, 1,2-dibutoxyethane, tetrahydrofuran, 2-methyl tetrahydrofuran, dimethylacetamide (DMAc), N-methyl-2-pyrrolidone (NMP), methyl acetate, ethyl acetate, methyl butyrate, ethyl butyrate, methyl propionate, ethyl propionate, propyl acetate (PA), γ-butyrolactone (GBL), ethylene carbonate (EC), propylene carbonate (PC), diethyl carbonate (DEC), ethylmethyl carbonate (EMC), dimethyl carbonate (DMC), 1,2-dimethoxyethane (DME), vinylene carbonate (VC), fluoroethylene carbonate (FEC), butylene carbonate, dipropyl carbonate, 1,1,2,2-tetrafluoroethyl-2,2,3,3-tetrafluoropropylether (TTFE) or a combination thereof. According to embodiments of the disclosure, the lithium-containing compound can be $LiPF_6$, $LiClO_4$, lithium bis(fluorosulfonyl) imide (LiFSI), lithium oxalyldifluoro borate (LiDFOB), $LiBF_4$, $LiSO_3CF_3$, $LiN(SO_2CF_3)_2$, $LiN(SO_2CF_2CF_3)_2$, $LiAsF_6$, $LiSbF_6$, $LiAlCl_4$, $LiGaCl_4$, $LiNO_3$, $LiC(SO_2CF_3)_3$, $LiSCN$, $LiO_3SCF_2CF_3$, $LiC_6F_5SO_3$, $LiO_2CCF_3$, $LiSO_3F$, $LiB(C_6H_5)_4$, $LiB(C_2O_4)_2$ (LiBOB), $LiFePO_4$, $Li_7La_3Zr_2O_{12}$, $LiLaTi_2O_6$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof. According to embodiments of the disclosure, the lithium-containing compound concentration of the electrolyte liquid can be from 0.2M to 10M.

In addition, According to some embodiments of the disclosure, the electrolyte liquid can be replaced with a solid electrolyte. The solid electrolyte can be $LiFePO_4$, $Li_7La_3Zr_2O_{12}$, $Li_{2.9}PO_{33}NO_{46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$ or a combination thereof.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Preparation of Negative Electrode Slurry

Preparation Example 1

γ-aluminum oxide nanoparticle (serving as lithiophilic nanoparticle) (with a particle size of about 30-50 nm) and silver nanoparticle (serving as metal nanoparticle) (with a particle size of about 30 nm) were dispersed in 1-methyl-2-pyrrolidone (NMP), obtaining a first solution after completely stirring (with a solid content of about 5 wt %). Next, polyvinylidene fluoride-co-hexafluoropropylene (PVDF-HFP) (commercially available from Sigma-Aldrich, with a weight average molecular weight of about 400,000) (serving as binder) was dissolved in 1-methyl-2-pyrrolidone (NMP), obtaining a second solution after completely stirring (with a solid content of about 5 wt %). Next, the first solution was mixed with the second solution and then the result was stirred for 24 hours, obtaining Negative electrode slurry (1). In Negative electrode slurry (1), the weight ratio of γ-aluminum oxide nanoparticle (serving as lithiophilic nanoparticle) to silver nanoparticle (serving as metal nanoparticle) was 3:1, and the amount of binder was about 25 wt % (based on the total weight of the lithiophilic nanoparticle and the metal nanoparticle), as shown in Table 3.

Preparation Example 2

Preparation Example 2 was performed in the same manner as the negative electrode slurry of Preparation Example 1, except that γ-aluminum oxide nanoparticle was replaced with conductive carbon material (commercially available from TimCal Co. with a trade designation of Super-P) (with a IG/ID of about 0.98) (with a particle size of about 50-70 nm), obtaining Negative electrode slurry (2). In Negative electrode slurry (2), the weight ratio of Super-P to silver nanoparticle and the amount of binder is shown in Table 3.

Preparation Example 3

Preparation Example 3 was performed in the same manner as the negative electrode slurry of Preparation Example 2, except that the amount of binder was reduced from 25 wt % to 11.11 wt %, obtaining Negative electrode slurry (3). In Negative electrode slurry (3), the weight ratio of Super-P to silver nanoparticle and the amount of binder is shown in Table 3.

Preparation Example 4

Preparation Example 4 was performed in the same manner as the negative electrode slurry of Preparation Example 3, except that the weight ratio of Super-P to silver nanoparticle was adjusted from 3:1 to 1:1, obtaining Negative electrode slurry (4). In Negative electrode slurry (4), the weight ratio of Super-P to silver nanoparticle and the amount of binder is shown in Table 3.

Preparation Example 5

Preparation Example 5 was performed in the same manner as the negative electrode slurry of Preparation Example 3, except that Super-P was replaced with the conductive carbon black (commercially available from NSA (Net Surface Area) with a trade designation of ECP-600) (with a IG/ID value of about 0.93) (with a particle size of about 34 nm), obtaining Negative electrode slurry (5). In Negative electrode slurry (5), the weight ratio of ECP-600 to silver nanoparticle and the amount of binder is shown in Table 3.

Preparation Example 6

γ-aluminum oxide nanoparticle and lithiated and sulfonated styrene-ethylene/butadiene-styrene copolymer (SSEBS-Li-60) were dispersed in 1-methyl-2-pyrrolidone (NMP), obtaining a first solution after completely stirring (with a solid content of about 5 wt %). Next, polyvinylidene fluoride-co-hexafluoropropylene (PVDF-HFP) (commercially available from Sigma-Aldrich, with a weight average molecular weight of about 400,000) (serving as binder) was dissolved in 1-methyl-2-pyrrolidone (NMP), obtaining a second solution after completely stirring (with a solid content of about 5 wt %). Next, the first solution was mixed with the second solution and then the result was stirred for 24 hours, obtaining Negative electrode slurry (6). In Negative electrode slurry (6), the weight ratio of γ-aluminum oxide nanoparticle to SSEBS-Li-60 was 3:1, and the amount of binder was 25 wt % (based on the total weight of the lithiophilic nanoparticle and the metal nanoparticle), as shown in Table 3.

Preparation Example 7

γ-aluminum oxide nanoparticle (serving as lithiophilic nanoparticle) (with a particle size of 30-50 nm) were dispersed in 1-methyl-2-pyrrolidone (NMP), obtaining a first solution after completely stirring (with a solid content of about 5 wt %). Next, polyvinylidene fluoride-co-hexafluoropropylene (PVDF-HFP) (commercially available from Sigma-Aldrich, with a weight average molecular weight of about 400,000) (serving as binder) was dissolved in 1-methyl-2-pyrrolidone (NMP), obtaining a second solution after completely stirring (with a solid content of about 5 wt %). Next, the first solution was mixed with the second solution and then the result was stirred for 24 hours, obtaining Negative electrode slurry (7). In Negative electrode slurry (7), the amount of binder was 25 wt % (based on the weight of γ-aluminum oxide nanoparticle), as shown in Table 3.

Preparation Example 8

Fluorocarbon (commercially available from HuBei ZhuoXi Fluorochemical Co., Ltd., with a trade designation of C03G0102) (with a particle size of about 500 nm) was dispersed in 1-methyl-2-pyrrolidone (NMP). After completely stirring, Negative electrode slurry (8) (with a solid content of about 5 wt %) was obtained.

Preparation Example 9

The conductive carbon material (commercially available from TimCal Co. with a trade designation of KS 6) (with a IG/ID value of about 1.2) (with a particle size of 1.6 μm-6.5 μm) and silver nanoparticle (serving as metal nanoparticle) (with a particle size of 30 nm) were dispersed in 1-methyl-2-pyrrolidone (NMP). After completely stirring, Negative electrode slurry (9) (with a solid content of about 5 wt %) was obtained. In Negative electrode slurry (9), the weight ratio of KS 6 to silver nanoparticle is shown in Table 3.

Preparation Example 10

γ-aluminum oxide nanoparticle (serving as lithiophilic nanoparticle) (with a particle size of 30-50 nm) and silver nanoparticle (serving as metal nanoparticle) (with a particle size of about 30 nm) were dispersed in 1-methyl-2-pyrrolidone (NMP), obtaining a first solution after completely stirring (with a solid content of about 5 wt %). Next, polyvinylidene fluoride-co-hexafluoropropylene (PVDF-HFP) (commercially available from Sigma-Aldrich, with a weight average molecular weight of about 400,000) (serving as binder) was dissolved in 1-methyl-2-pyrrolidone (NMP), obtaining a second solution after completely stirring (with a solid content of about 5 wt %). Next, the first solution was mixed with the second solution and then the result was stirred for 24 hours, obtaining Negative electrode slurry (10). In Negative electrode slurry (10), the weight ratio of γ-aluminum oxide nanoparticle (serving as lithiophilic nanoparticle) to silver nanoparticle (serving as metal nanoparticle) was 9:1, and the amount of binder was 11.11 wt % (based on the total weight of the lithiophilic nanoparticle and the metal nanoparticle), as shown in Table 3.

Preparation Example 11

Preparation Example 11 was performed in the same manner as the negative electrode slurry of Preparation Example 2, except that the amount of binder was reduced from 25 wt % to 1.11 wt %, obtaining Negative electrode slurry (11). In Negative electrode slurry (11), the weight ratio of Super-P to silver nanoparticle and the amount of binder is shown in Table 3.

Preparation Example 12

Preparation Example 12 was performed in the same manner as the negative electrode slurry of Preparation Example 2, except that Super-P was replaced with titanium dioxide nanoparticle (serving as lithiophilic nanoparticle) (with a particle size of about 100 nm), obtaining Negative electrode slurry (12). In Negative electrode slurry (12), the weight ratio of titanium dioxide nanoparticle to silver nanoparticle and the amount of binder is shown in Table 3.

Preparation Example 13

Preparation Example 13 was performed in the same manner as the negative electrode slurry of Preparation Example 3, except that Super-P was replaced with the conductive carbon material (commercially available from TimCal Co. with a trade designation of KS 6) (with a IG/ID value of about 1.2) (with a particle size of 1.6 μm-6.5 μm), obtaining Negative electrode slurry (13). In Negative electrode slurry (13), the weight ratio of KS 6 to silver nanoparticle and the amount of binder is shown in Table 3.

Preparation Example 14

Preparation Example 14 was performed in the same manner as the negative electrode slurry of Preparation Example 3, except that silver nanoparticle was replaced with copper nanoparticle (with a particle size of 40-60 nm), obtaining Negative electrode slurry (14). In Negative electrode slurry (14), the weight ratio of Super P to copper nanoparticle and the amount of binder is shown in Table 3.

TABLE 3

| | lithiophilic nanoparticle | metal nanoparticle | lithiophilic nanoparticle:metal nanoparticle | binder (wt %) |
|---|---|---|---|---|
| Preparation Example 1 | γ-Al$_2$O$_3$ | Ag | 3:1 | 25 |
| Preparation Example 2 | Super-P | Ag | 3:1 | 25 |
| Preparation Example 3 | Super-P | Ag | 3:1 | 11.11 |
| Preparation Example 4 | Super-P | Ag | 1:1 | 11.11 |
| Preparation Example 5 | ECP-600 | Ag | 3:1 | 11.11 |
| Preparation Example 6 | γ-Al$_2$O$_3$ | Ag replaced with SSEBS-Li-60 | 3:1 | 25 |
| Preparation Example 7 | γ-Al$_2$O$_3$ | — | — | 25 |
| Preparation Example 8 | fluorocarbon | — | — | — |
| Preparation Example 9 | KS 6 | Ag | 3:1 | — |
| Preparation Example 10 | γ-Al$_2$O$_3$ | Ag | 9:1 | 11.11 |
| Preparation Example 11 | Super-P | Ag | 3:1 | 1.11 |
| Preparation Example 12 | TiO$_2$ | Ag | 3:1 | 11.11 |
| Preparation Example 13 | KS 6 | Ag | 3:1 | 11.11 |
| Preparation Example 14 | Super-P | Cu | 3:1 | 11.11 |

Evaluation of Composite Layer

Example 1

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided. Next, Negative electrode slurry (1) of Preparation Example 1 was coated on the lithium foil of the lamination by blade coating, and the result was baked at 80° C. to form a negative electrode with a composite layer (the weight per unit area of the composite layer was about 1.5 mg/cm$^2$). Next, a lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as positive electrode. Next, a separator (available under the trade designation of Celgard 2320) was provided. Next, the negative electrode, the separator, and the positive electrode were placed in sequence (wherein the lithium foil of the positive electrode was oriented toward the separator) and sealed within a cell, and then an electrolyte liquid (including lithium bis(fluorosulfonyl)imide (LiFSI) and a solvent, wherein the solvent was 1,2-dimethoxyethane (DME) and 1,1,2,2-tetrafluoroethyl-2,2,3,3-tetrafluoropropyl ether (TTFE), the molar ratio of LiFSI, DME and TTFE was 1:1.2:3.0), obtaining Battery (1).

Next, the polarization voltage and the polarization voltage difference of Battery (1) were measured, as shown in Table 4. The method for measuring the polarization voltage was disclosed below. The battery was charged and discharged at a fixed current density of 0.1 mAcm$^{-2}$ and a charging capacity of 3 mhAcm$^{-2}$ wherein the polarization voltage was the initial voltage during charging in the cycle. The method for measuring the polarization voltage difference was disclosed below. The battery was charged and discharged at a fixed current density of 0.5 mAcm$^{-2}$ and a charging capacity of 3 mhAcm$^{-2}$. The polarization voltage difference was the percentage represented by the difference between the median voltage and the polarization voltage at the 150$^{th}$ charging/discharging cycle, based on the median voltage.

Example 2

Example 2 was performed in the same manner as the battery of Example 1, except that Negative electrode slurry (1) was replaced by Negative electrode slurry (3), obtaining Battery (2). Next, the polarization voltage and the polarization voltage difference of Battery (2) were measured, as shown in Table 4.

Example 3

Example 3 was performed in the same manner as the battery of Example 1, except that Negative electrode slurry (1) was replaced by Negative electrode slurry (5), obtaining Battery (3). Next, the polarization voltage and the polarization voltage difference of Battery (3) were measured, as shown in Table 4.

Comparative Example 1

A lamination consisting of a lithium foil and a copper foil (commercially available from Honjo Metal Co., Ltd.) (with a thickness of 60 μm) (the lithium foil served as the active material layer, and the copper foil served as the current-collecting layer) serving as negative electrode. Next, a lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as positive electrode. Next, a separator (available under the trade designation of Celgard 2320) was provided. Next, the negative electrode, the separator, and the positive electrode were placed in sequence (wherein the lithium foil of the positive electrode was oriented toward the separator, and the lithium foil of the negative electrode was oriented toward the separator) and sealed within a cell, and then an electrolyte liquid (including lithium bis(fluorosulfonyl)imide (LiFSI) and a solvent, wherein the solvent was 1,2-dimethoxyethane (DME) and 1,1,2,2-tetrafluoroethyl-2,2,3,3-tetrafluoropropyl ether (TTFE), the molar ratio of LiFSI, DME and TTFE was 1:1.2:3.0) was injected into the cell, obtaining Battery (4). Next, the polarization voltage and the polarization voltage difference of Battery (4) were measured, as shown in Table 4.

Comparative Example 2

Comparative Example 2 was performed in the same manner as the battery of Example 1, except that Negative electrode slurry (1) was replaced by Negative electrode slurry (6), obtaining Battery (5). Next, the polarization voltage and the polarization voltage difference of Battery (5) were measured, as shown in Table 4.

Comparative Example 3

Comparative Example 3 was performed in the same manner as the battery of Example 1, except that Negative electrode slurry (1) was replaced by Negative electrode slurry (7), obtaining Battery (6). Next, the polarization voltage and the polarization voltage difference of Battery (6) were measured, as shown in Table 4.

Comparative Example 4

Comparative Example 4 was performed in the same manner as the battery of Example 1, except that Negative electrode slurry (1) was replaced by Negative electrode slurry (8), obtaining Battery (7). Next, the polarization voltage and the polarization voltage difference of Battery (7) were measured, as shown in Table 4.

Comparative Example 5

Comparative Example 5 was performed in the same manner as the battery of Example 1, except that Negative electrode slurry (1) was replaced by Negative electrode slurry (9), obtaining Battery (8). Next, the polarization voltage and the polarization voltage difference of Battery (8) were measured, as shown in Table 4.

Comparative Example 6

Comparative Example 6 was performed in the same manner as the battery of Example 1, except that Negative electrode slurry (1) was replaced by Negative electrode slurry (12), obtaining Battery (9). Next, the polarization voltage and the polarization voltage difference of Battery (9) were measured, as shown in Table 4.

Comparative Example 7

Comparative Example 7 was performed in the same manner as the battery of Example 1, except that Negative electrode slurry (1) was replaced by Negative electrode slurry (13), obtaining Battery (10). Next, the polarization voltage and the polarization voltage difference of Battery (10) were measured, as shown in Table 4.

Comparative Example 8

Comparative Example 8 was performed in the same manner as the battery of Example 1, except that Negative electrode slurry (1) was replaced by Negative electrode slurry (14), obtaining Battery (11). Next, the polarization voltage and the polarization voltage difference of Battery (11) were measured, as shown in Table 4.

TABLE 4

| | polarization voltage (mV) | polarization voltage difference (%) |
|---|---|---|
| Example 1 | 15.3 | <~5 |
| Example 2 | 7.2 | <~5 |
| Example 3 | 6.9 | <~5 |
| Comparative Example 1 | 21.4 | >50 |
| Comparative Example 2 | 44.5 | >15 |
| Comparative Example 3 | 59.2 | >15 |

TABLE 4-continued

|  | polarization voltage (mV) | polarization voltage difference (%) |
|---|---|---|
| Comparative Example 4 | 34.0 | >10 |
| Comparative Example 5 | 28.8 | >50 |
| Comparative Example 6 | 52.6 | >10 |
| Comparative Example 7 | 51.2 | >10 |
| Comparative Example 8 | 162.5 | >50 |

The polarization voltage depends on the interfacial impedance of the lithium deposition. When the polarization voltage is high, it means that the lithium deposition exhibits higher interfacial impedance. The interfacial impedance includes the impedance between the solid electrolyte interface (SEI) layer and the structural layer. In principle, a smaller polarization voltage of the solid electrolyte interface (SEI) layer indicates that the probability of dendrite growth is low. However, due to the influence of the impedance of the structural layer, it is necessary to further confirm the behavior of lithium deposition from the polarization voltage difference. The polarization voltage difference depends on the stacking morphology of the lithium deposition. When the polarization voltage difference is high, the lithium deposition grows along a perpendicular direction. When the polarization voltage difference is low, the lithium deposition grows along a horizontal direction, thereby uniforming the lithium deposition to form a planar distribution. As shown in Table 4, the batteries of Examples 1-3 have the specific negative electrode of the disclosure. Due to the specific components (i.e. including the specific lithiophilic nanoparticle, the specific metal nanoparticle, and the binder) of the composite layer and the specific amount of components (i.e. the specific weight ratio of the lithiophilic nanoparticle to the metal nanoparticle, and the specific amount of binder), the morphology of lithium deposition can be altered, thereby reducing the low polarization voltage and polarization voltage difference. Therefore, the lithium deposition grows along the horizontal direction, thereby inhibiting dendrite growth and improving the problem of electrode swelling along the perpendicular direction. As a result, the performance (such as energy density) of the lithium ion battery is enhanced and the life cycle and Coulombic efficiency of the lithium ion battery are increased. Since the negative electrode slurry used in Comparative Example 3 does not include the metal nanoparticle of the disclosure (i.e. Comparative Example 3 did not have the composite layer of the disclosure), the battery of Comparative Example 3 exhibits high polarization voltage, and the polarization voltage variation is sharp. In the negative electrode slurry used in Comparative Example 6, since the non-lithiophilic nanoparticle (TiO$_2$) is substituted for the lithiophilic nanoparticle of the disclosure, the battery of Comparative Example 6 exhibits higher polarization voltage, and the polarization voltage variation is sharp. In the negative electrode slurry used in Comparative Example 7, since the carbon material (KS 6) with a IG/ID value greater than 1 is substituted for the carbon material (such as Super-P) with a IG/ID value less than 1, the battery of Comparative Example 7 exhibits higher polarization voltage, and the polarization voltage variation is sharp.

Figure 4:
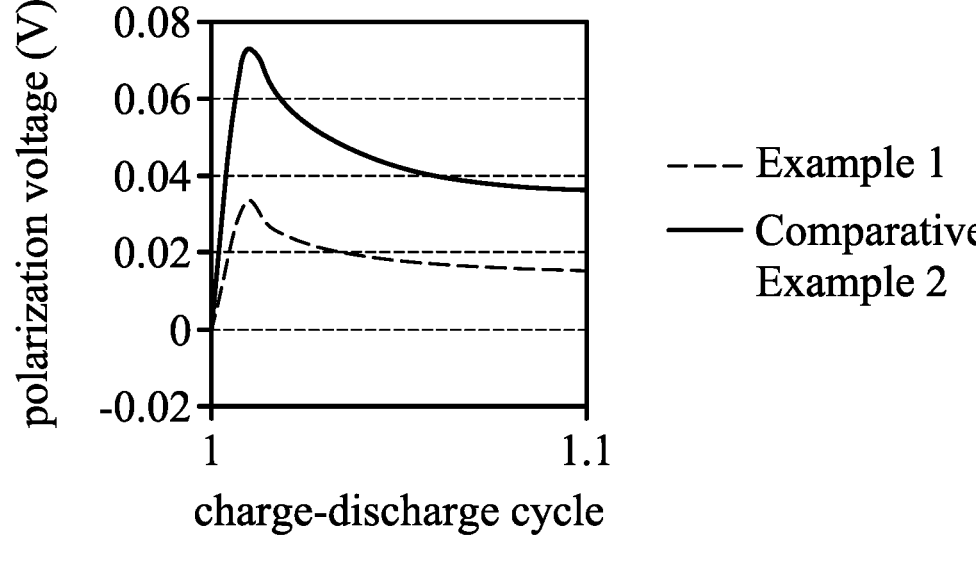
FIG. 4 is a graph plotting the polarization voltage of the battery of Example 1 and Comparative Example 2 against charge-discharge cycle.

FIG. 4 is a graph plotting the polarization voltage (measured at a fixed current density of 0.1 mAcm$^2$) of the battery of Example 1 and Comparative Example 2 against charge-discharge cycle. In the negative electrode slurry used in Comparative Example 2, since the single-ion conductive polymer is substituted for the metal nanoparticle of the disclosure (i.e. the negative electrode of Comparative Example 2 does not have the composite layer of the disclosure), the battery of Comparative Example 2 exhibits higher initial polarization voltage, and the polarization voltage variation is sharp. In comparison with Comparative Example 2, since the battery of Example 1 has the negative electrode of the disclosure, the battery of Example 1 exhibits lower initial polarization voltage, and the polarization voltage variation is non-obvious.

Figure 5:
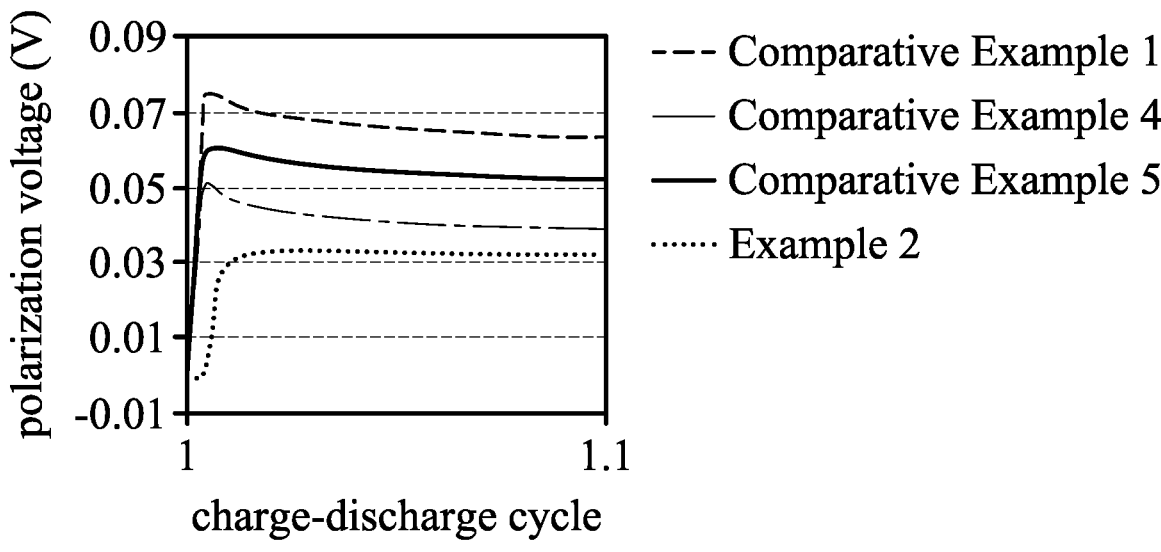
FIG. 5 is a graph plotting the polarization voltage of the battery of Example 2, Comparative Example 1, Comparative Example 4, and Comparative Example 5 against charge-discharge cycle.

FIG. 5 is a graph plotting the polarization voltage (measured at a fixed current density of 0.1 mAcm$^2$) of the battery of Example 2, Comparative Example 1, Comparative Example 4, and Comparative Example 5 against charge-discharge cycle. Since the Comparative Example 1 employs a simple negative electrode (merely including an active layer and a current-collecting layer) which does not have the composite layer of the disclosure, the battery of Comparative Example 1 exhibits higher initial polarization voltage, and the polarization voltage variation is sharp. In the negative electrode of Comparative Example 4, a fluorocarbon layer is merely formed on the active layer of the negative electrode, the battery of Comparative Example 4 exhibits higher initial polarization voltage, and the polarization voltage variation is sharp. In the negative electrode of Comparative Example 5, the film, which forms on the active layer of the negative electrode, consists of the conductive carbon material (KS 6) (with a IG/ID value greater than 1) and silver nanoparticle, the battery of Comparative Example 5 exhibits higher initial polarization voltage, and the polarization voltage variation is sharp. In comparison with Comparative Example 1, Comparative Example 4, and Comparative Example 5, since the battery of Example 2 employs the negative electrode of the disclosure, the battery of Example 2 exhibits lower initial polarization voltage, and the polarization voltage variation is relatively smooth.

Example 4

A copper foil (commercially available from Nikko Metals Taiwan Co., Ltd., with a thickness of 10 μm) was provided. Next, Negative electrode slurry (3) of Preparation Example 3 was coated on the copper foil by blade coating, and the result was baked at 80° C. to form a negative electrode with a composite layer, wherein the weight per unit area of the composite layer was controlled to be about 1.5 mg/cm$^2$. Next, a lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as positive electrode. Next, a separator (available under the trade designation of Celgard 2320) was provided. Next, the negative electrode, the separator, and the positive electrode were placed in sequence (wherein the lithium foil of the positive electrode was oriented toward the separator) and sealed within a cell, and then an electrolyte liquid (including lithium bis(fluorosulfonyl)imide (LiFSI) and a solvent, wherein the solvent was 1,2-dimethoxyethane (DME) and 1,1,2,2-tetrafluoroethyl-2,2,3,3-tetrafluoropropyl ether (TTFE), wherein the molar ratio of LiFSI, DME and TTFE was 1:1.2:3.0) was injected into the cell, obtaining Battery (12).

Next, the energy density of Battery (12) were measured (at a fixed current density of 0.5 mAcm$^{-2}$ and a charging capacity of 3 mhAcm$^{-2}$ during charging and discharging), as shown in Table 5.

Example 5

Example 5 was performed in the same manner as the battery of Example 4, except that the weight per unit area of the composite layer was increased from about 1.5 mg/cm$^2$ to 2 mg/cm$^2$, obtaining Battery (13). Next, the energy density of Battery (13) were measured (at a fixed current density of 0.5 mAcm$^{-2}$ and a charging capacity of 3 mhAcm$^{-2}$ during charging and discharging).

Comparative Example 9

Comparative Example 9 was performed in the same manner as the battery of Example 4, except that the weight per unit area of the composite layer was increased from about 1.5 mg/cm$^2$ to 6 mg/cm$^2$, obtaining Battery (14). Next, the energy density of Battery (14) were measured (at a fixed current density of 0.5 mAcm$^{-2}$ and a charging capacity of 3 mhAcm$^{-2}$ during charging and discharging).

TABLE 5

| | the weight per unit area of the composite layer (mg/cm$^2$) | energy density (Wh/kg) |
|---|---|---|
| Example 4 | 1.5 | 350 |
| Example 5 | 2 | 300 |
| Comparative Example 9 | 6 | 275 |

As shown in Table 5, when the weight per unit area of the composite layer is in the range from 0.2 mg/cm$^2$ to 2 mg/cm$^2$, the energy density (Wh/kg) of the battery can be equal to or greater than 300 Wh/kg. When the weight per unit area of the composite layer is greater than 2 mg/cm$^2$ (i.e. Comparative Example 9), the energy density (Wh/kg) of the battery is not enhanced.

Example 6

A copper foil (commercially available from Nikko Metals Taiwan Co., Ltd., with a thickness of 10 μm) was provided. Next, Negative electrode slurry (2) of Preparation Example 2 was coated on the copper foil, and the result was baked at 80° C. to form a negative electrode with a composite layer, wherein the weight per unit area of the composite layer was controlled to be about 2 mg/cm$^2$. Next, a lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as positive electrode. Next, a separator (available under the trade designation of Celgard 2320) was provided. Next, the negative electrode, the separator, and the positive electrode were placed in sequence (wherein the lithium foil of the positive electrode was oriented toward the separator) and sealed within a cell, and then an electrolyte liquid (including lithium bis(fluorosulfonyl)imide (LiFSI) and a solvent, wherein the solvent was 1,2-dimethoxyethane (DME) and 1,1,2,2-tetrafluoroethyl-2,2,3,3-tetrafluoropropyl ether (TTFE), wherein the molar ratio of LiFSI, DME and TTFE was 1:1.2:3.0) was injected into the cell, obtaining Battery (15).

Next, the polarization voltage and polarization voltage difference of Battery (15) were measured (at a fixed current density of 0.5 mAcm$^{-2}$ and a charging capacity of 3 mhAcm$^{-2}$ during charging and discharging), as shown in Table 6.

Example 7

Example 7 was performed in the same manner as the battery of Example 6, except that Negative electrode slurry (2) was replaced with Negative electrode slurry (4), obtaining Battery (16). Next, the polarization voltage and polarization voltage difference of Battery (16) were measured (at a fixed current density of 0.5 mAcm$^{-2}$ and a charging capacity of 3 mhAcm$^{-2}$ during charging and discharging), as shown in Table 6.

Comparative Example 10

Comparative Example 10 was performed in the same manner as the battery of Example 6, except that Negative electrode slurry (2) was replaced with Negative electrode slurry (10), obtaining Battery (17). Next, the polarization voltage and polarization voltage difference of Battery (17) were measured (at a fixed current density of 0.5 mAcm$^{-2}$ and a charging capacity of 3 mhAcm$^{-2}$ during charging and discharging), as shown in Table 6.

Comparative Example 11

Comparative Example 11 was performed in the same manner as the battery of Example 6, except that Negative electrode slurry (2) was replaced with Negative electrode slurry (11), obtaining Battery (18). Next, the polarization voltage and polarization voltage difference of Battery (18) were measured (at a fixed current density of 0.5 mAcm$^{-2}$ and a charging capacity of 3 mhAcm$^{-2}$ during charging and discharging), as shown in Table 6.

Comparative Example 12

Comparative Example 12 was performed in the same manner as the battery of Example 6, except that Negative electrode slurry (2) was replaced with Negative electrode slurry (14), obtaining Battery (23).

TABLE 6

| | polarization voltage (mV) | polarization voltage difference (%) |
|---|---|---|
| Example 5 | 37.8 | <~5 |
| Example 6 | 56.6 | <~5 |
| Example 7 | 68.5 | <~5 |
| Comparative Example 10 | 36.3 | >15 |
| Comparative Example 11 | 34.3 | >150 |

As shown in Table 6, in the negative electrode slurry, when the weight ratio of the lithiophilic nanoparticle to the metal nanoparticle is greater than 8:1, the polarization voltage variation of the battery (i.e. Comparative Example 10) is sharp. In addition, when the amount of binder in the negative electrode slurry is too low, a uniform lithium deposition is not promoted, and the polarization voltage variation of the battery (i.e. Comparative Example 11) is sharp. Therefore, due to the specific components (i.e. including the specific lithiophilic nanoparticle, the specific metal nanoparticle, and binder) and the specific amount (i.e. the weight ratio of the lithiophilic nanoparticle to the metal nanoparticle, and the amount of binder) of the components in the composite layer, the cycling stability of the lithium ion battery can be enhanced.

The initial reversible capacity percentage of the batteries of Example 5, Example 7, Comparative Example 10, and Comparative Example 12 was measured (at a fixed current density of 0.5 $mAcm^{-2}$ and a charging capacity of 3 $mhAcm^{-2}$ during charging and discharging), as shown in Table 7.

TABLE 7

| | reversible capacity percentage (%) |
| --- | --- |
| Example 5 | 91 |
| Example 7 | 91 |
| Comparative Example 10 | 53 |
| Comparative Example 12 | 83 |

As shown in Table 7, in the negative electrode slurry, when the weight ratio of the lithiophilic nanoparticle to the metal nanoparticle is greater than 8:1, the battery (i.e. Comparative Example 10) exhibits relatively high reversible capacity loss. In addition, when silver nanoparticle (serving as metal nanoparticle in the negative electrode slurry) is replaced with copper nanoparticle, the battery (i.e. Comparative Example 12) exhibits obviously increased reversible capacity loss. As shown in Table 7, due to the specific components (i.e. including the specific lithiophilic nanoparticle, the specific metal nanoparticle, and binder) and the specific amount (i.e. the weight ratio of the lithiophilic nanoparticle to the metal nanoparticle, and the amount of binder) of the components in the composite layer, the reversible capacity loss of the battery can be reduced, and the battery performance can be enhanced.

Figure 6:
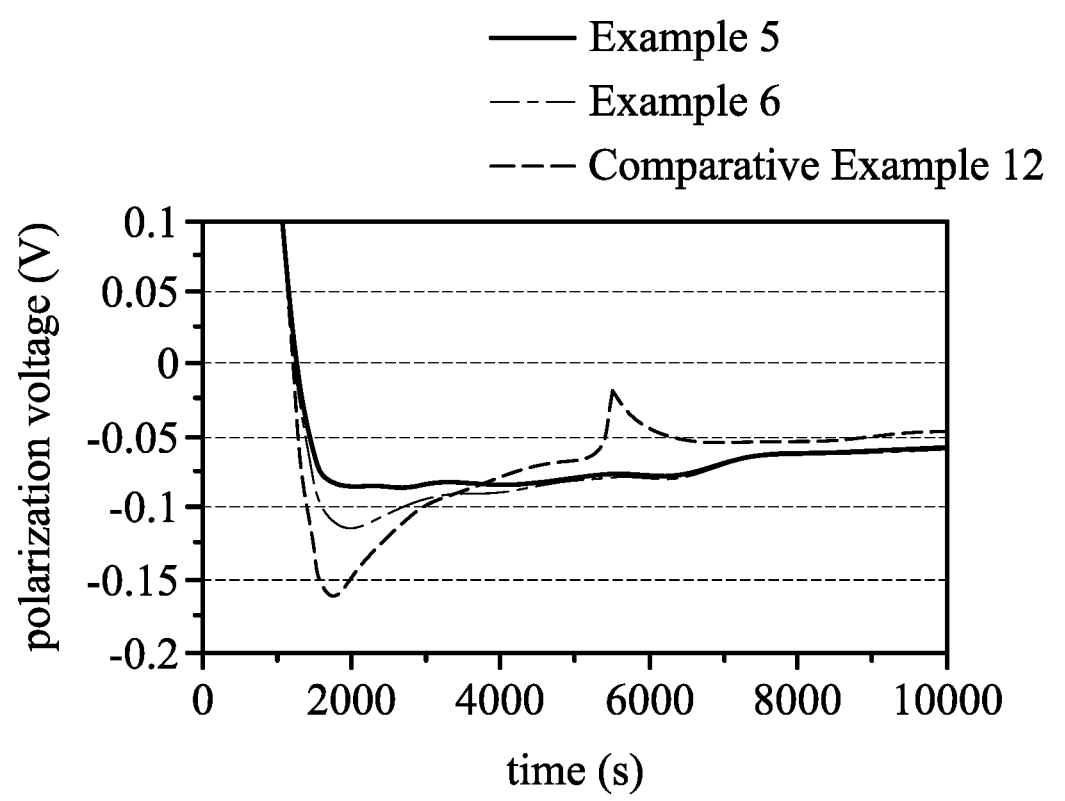
FIG. 6 is a graph plotting the polarization voltage of the battery of Example 5, Example 6, and Comparative Example 12 against time.

FIG. 6 is a graph plotting the polarization voltage (measured at a fixed current density of 0.5 $mAcm^{-2}$ and a charging capacity of 3 $mhAcm^{-2}$ during charging and discharging) of the battery of Example 5, Example 6, and Comparative Example 12 against deposition time. In the negative electrode slurry of Comparative Example 12, since the copper nanoparticle is substituted for silver nanoparticle (serving as metal nanoparticle), the battery exhibits a sharp polarization voltage variation, and a sudden peak is generated. It means that a undesired morphology ((i.e. needle-like dendrites and dead lithium (such as cracked dendrites)) of lithium deposition is produced during charging and discharging the battery of Comparative Example 12, thereby deteriorating the battery performance and reducing the life cycle of the battery.

Lithium Metal Battery

Example 8

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided. Next, Negative electrode slurry (1) of Preparation Example 1 was coated on the lithium foil of the lamination by blade coating, and the result was baked at 80° C. to form a negative electrode with a composite layer (with a weight per unit area of the composite layer was about 2 $mg/cm^2$). Next, a standard lithium ion battery positive electrode slurry (including 97.3% of NMC811 ($LiNi_iMn_j Co_kO_2$, wherein i: 0.83~0.85; j: 0.4~0.5; k: 0.11~0.12) (commercially available from Ningbo Ronbay New Energy Technology Co., Ltd. with a trade designation of NMC811-S85E), 1% of Super-P (conductive carbon powder, commercially available from TimCal Co.), 1.4% of PVDF-5130, and 0.3% of carbon nanotube (with a trade number of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode was obtained. Next, a separator (available under the trade designation of Celgard 2320) was provided. Next, the negative electrode, the separator, and the positive electrode were placed in sequence (wherein the lithium foil of the negative electrode was oriented toward the separator) and sealed within a cell, and then an electrolyte liquid (including lithium difluoro(oxalato) borate (LiD-FOB) and a solvent, wherein the solvent was fluoroethylene carbonate (FEC) and diethyl carbonate (DEC)) (the volume ratio of FEC to DEC was 1:2 and the concentration of LiDFOB was 0.6M) was injected into the cell, obtaining Battery (20). The charge/discharge efficiency of Battery (20) was measured at a charge/discharge rate of 0.1 C/0.2 C, and then the capacity retention at the $60^{th}$ charging/discharging cycle was measured. The results are shown in Table 8.

Example 9

Example 9 was performed in the same manner as the battery of Example 8, except that Negative electrode slurry (1) was replaced with Negative electrode slurry (3), obtaining Battery (21). Next, the charge/discharge efficiency of Battery (21) was measured at a charge/discharge rate of 0.1 C/0.2 C, and then the capacity retention at the $60^{th}$ charging/discharging cycle was measured. The results are shown in Table 8.

Comparative Example 13

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as negative electrode. Next, a standard lithium ion battery positive electrode slurry (including 97.3% of NMC811 ($LiNi_iMn_j Co_kO_2$, wherein i: 0.83~0.85; j: 0.4~0.5; k: 0.11~0.12) (commercially available from Ningbo Ronbay New Energy Technology Co., Ltd. with a trade designation of NMC811-S85E), 1% of Super-P (conductive carbon powder, commercially available from TimCal Co.), 1.4% of PVDF-5130, and 0.3% of carbon nanotube (with a trade number of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode was obtained. Next, a separator (available under the trade designation of Celgard 2320) was provided. Next, the negative electrode, the separator, and the positive electrode were placed in sequence (wherein the lithium foil of the negative electrode was oriented toward the separator) and sealed within a cell, and then an electrolyte liquid (including lithium difluoro(oxalato) borate (LiDFOB), lithium tetrafluoroborate ($LiBF_4$) and a solvent, wherein the solvent was fluoroethylene carbonate (FEC) and diethyl carbonate (DEC)) (the volume ratio of FEC to DEC was 1:2, the concentration of LiDFOB was 0.6M and the concentration of $LiBF_4$ was 0.6M) was injected into the cell, obtaining Battery (22).

Next, the charge/discharge efficiency of Battery (22) was measured at a charge/discharge rate of 0.1 C/0.2 C, and then the capacity retention at the $60^{th}$ charging/discharging cycle was measured. The results are shown in Table 8.

Comparative Example 14

Comparative Example 14 was performed in the same manner as the battery of Example 8, except that Negative electrode slurry (1) was replaced with Negative electrode slurry (8), obtaining Battery (23). Next, the charge/discharge efficiency of Battery (23) was measured at a charge/discharge rate of 0.1 C/0.2 C, and then the capacity retention at the $60^{th}$ charging/discharging cycle was measured. The results are shown in Table 8.

Comparative Example 15

Comparative Example 15 was performed in the same manner as the battery of Example 10, except that Negative electrode slurry (1) was replaced with Negative electrode slurry (9), obtaining Battery (24). Next, the charge/discharge efficiency of Battery (24) was measured at a charge/discharge rate of 0.1 C/0.2 C, and then the capacity retention at the $60^{th}$ charging/discharging cycle was measured. The results are shown in Table 8.

TABLE 8

| | capacity retention (%) ($60^{th}$ charging/discharging cycle) |
|---|---|
| Example 8 | 97.7 |
| Example 9 | 96.2 |
| Comparative Example 13 | 58.5 |
| Comparative Example 14 | 82.8 |
| Comparative Example 15 | 90.3 |

As shown in Table 8, since the battery of Comparative Example 13 does not include the composite layer of the disclosure, the battery exhibits low capacity retention. In addition, since a fluorocarbon layer is merely formed on the active layer in the negative electrode of Comparative Example 14, and the film (consisting of the conductive carbon material (KS 6) with a IG/ID value greater than 1 and silver nanoparticle) is formed on the active layer in the negative electrode of Comparative Example 14, the capacity retention of the batteries of Comparative Example 14 and Comparative Example 15 is not effectively improved. In comparison with Comparative Example 13, Comparative Example 14 and Comparative Example 15, since the batteries of Example 8 and Example 9 employ the negative electrode of the disclosure, the capacity retention of the batteries can be greater than 95%.

Figure 7:
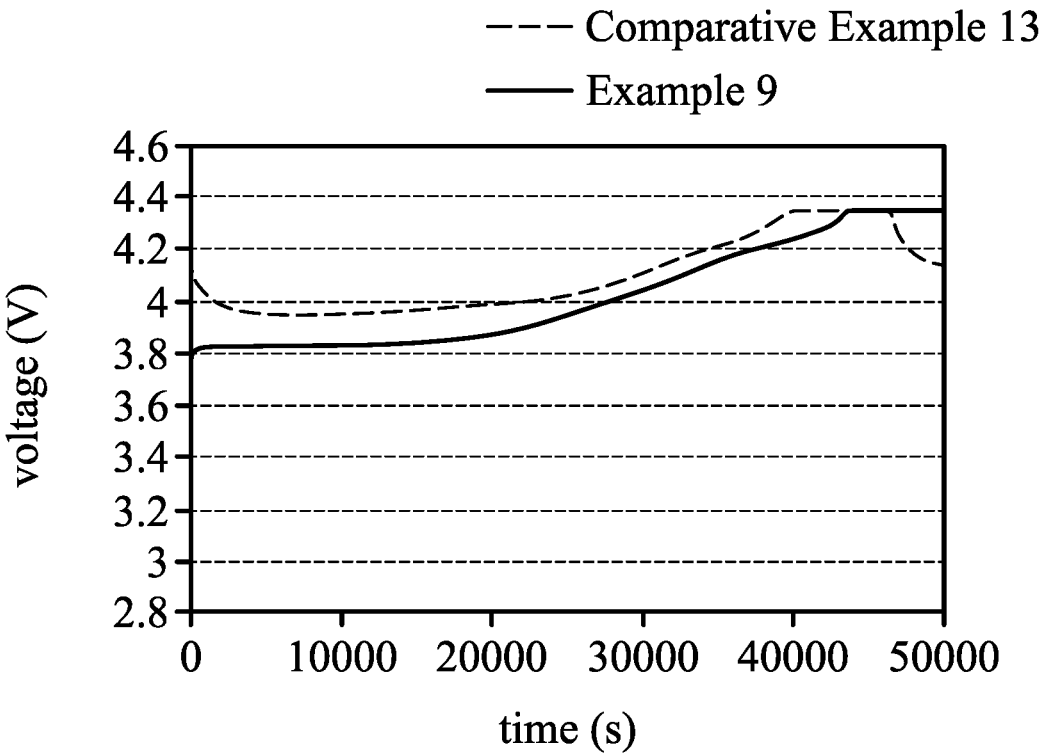
FIG. 7 is a graph plotting the polarization voltage of the battery of Example 9 and Comparative Example 13 against time.

FIG. 7 is a graph plotting the polarization voltage (measured at the end-of-charge voltage was 4.35V and the capacity of positive electrode is 5 mhAcm²) of the battery of Example 9 and Comparative Example 13 against time. Since the battery of Comparative Example 13 does not have the composite layer of the disclosure, the battery exhibits high internal impedance, thereby reducing the charge capacity and life cycle. In comparison with Comparative Example 13, the battery of Example 9 employs the negative electrode of the disclosure, the battery exhibits low internal impedance, thereby enhancing the charge capacity and life cycle.

Accordingly, the negative electrode, which has the specific structure and components, of the disclosure can inhibit dendrite growth and mitigate the volume swelling issue during charging and discharging the battery. As a result, the battery performance and the life cycle of the battery can be improved.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A negative electrode, comprising:
   an active layer, wherein the active layer is lithium metal, lithium-containing alloy, or a combination thereof,
   a composite layer disposed on the active layer, wherein the composite layer comprises a lithiophilic nanoparticle, a metal nanoparticle, and a binder, wherein the binding energy ($\Delta E$) of the lithiophilic nanoparticle with lithium is less than or equal to $-2.5$ eV, and the metal nanoparticle has a standard Gibbs free energy of reaction ($\Delta rG$) less than 0, wherein the weight ratio of the lithiophilic nanoparticle to the metal nanoparticle is from 1:1 to 8:1, and the amount of binder is from 10 wt % to 25 wt %, based on the total weight of the lithiophilic nanoparticle and the metal nanoparticle, wherein the lithiophilic nanoparticle is $\gamma$-aluminum oxide, zirconium oxide, zinc oxide, silicon oxide, tin oxide, vanadium oxide, lithium-lanthanum-zirconium oxide, lithium lanthanum titanium oxide, graphite with a IG/ID value less than 1, fluorocarbon, nitrogen-doped graphite with a IG/ID value less than 1, nitrogen-doped graphene, or a combination thereof, and wherein the metal nanoparticle is silver, gold, magnesium, or a combination thereof; and
   a current-collecting layer, wherein the active layer is disposed between the composite layer and the current-collecting layer.

2. The negative electrode as claimed in claim 1, wherein the current-collecting layer is aluminum, aluminum-containing alloy, copper, copper-containing alloy, nickel, nickel-containing alloy, stainless steel, or a combination thereof.

3. The negative electrode as claimed in claim 1, wherein the particle size of the lithiophilic nanoparticle is less than or equal to 100 nm.

4. The negative electrode as claimed in claim 1, wherein the particle size of the metal nanoparticle is less than or equal to 100 nm.

5. The negative electrode as claimed in claim 1, wherein the weight per unit area of the composite layer is 0.2 mg/cm² to 2 mg/cm².

6. A lithium ion battery, comprising:
   a positive electrode;
   a separator;
   the negative electrode as claimed in claim 1, wherein the negative electrode is separated from the positive electrode by the separator; and
   an electrolyte liquid disposed between the positive electrode and the negative electrode.

\* \* \* \* \*